(12) United States Patent
Vinnnakota et al.

(10) Patent No.: US 7,249,248 B2
(45) Date of Patent: Jul. 24, 2007

(54) METHOD, APPARATUS, AND SYSTEM FOR VARIABLE INCREMENT MULTI-INDEX LOOPING OPERATIONS

(75) Inventors: Bapiraiu Vinnnakota, Fremont, CA (US); Saleem Mohammadali, Marathahalli (IN); Carl A. Alberola, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 486 days.

(21) Appl. No.: 10/303,565

(22) Filed: Nov. 25, 2002

(65) Prior Publication Data

US 2004/0103270 A1    May 27, 2004

(51) Int. Cl.
 *G06F 9/44*    (2006.01)
(52) U.S. Cl. ...................................... 712/241
(58) Field of Classification Search ................ 712/241; 710/22, 24, 33
 See application file for complete search history.

(56) References Cited

U.S. PATENT DOCUMENTS

| | | | |
|---|---|---|---|
| 5,473,761 A * | 12/1995 | Parks et al. ..................... | 711/4 |
| 5,511,178 A | 4/1996 | Takeda et al. | |
| 5,526,397 A | 6/1996 | Lohman | |
| 5,579,493 A | 11/1996 | Kiuchi et al. | |
| 5,742,781 A | 4/1998 | Bajwa | |
| 5,809,326 A | 9/1998 | Nogami | |
| 5,835,788 A * | 11/1998 | Blumer et al. ................. | 710/23 |
| 5,872,989 A | 2/1999 | Tsushima et al. | |
| 5,893,142 A | 4/1999 | Moyer et al. | |
| 5,931,920 A * | 8/1999 | Ghaffari et al. ................. | 710/5 |
| 5,951,679 A | 9/1999 | Anderson et al. | |
| 6,085,315 A | 7/2000 | Fleck et al. | |
| 6,105,080 A * | 8/2000 | Holt et al. ..................... | 710/26 |
| 6,243,807 B1 | 6/2001 | Chi | |
| 6,269,440 B1 | 7/2001 | Fernando et al. | |
| 6,367,071 B1 | 4/2002 | Cao et al. | |
| 6,421,744 B1 * | 7/2002 | Morrison et al. ............. | 710/22 |

(Continued)

FOREIGN PATENT DOCUMENTS

EP        0 511 484 A2    11/1992

(Continued)

OTHER PUBLICATIONS

Hobson, et al. A Concurrent Architecture for 622 Mb/s ATM Segmentation and Reassembly. 1995, IEEE.*

(Continued)

*Primary Examiner*—Eddie Chan
*Assistant Examiner*—Jacob Petranek
(74) *Attorney, Agent, or Firm*—Blakely, Sokoloff, Taylor & Zafman LLP (57) ABSTRACT

According to one embodiment of the invention, an apparatus is provided which includes a first register to hold an initial value of a first index associated with a looping instruction to be executed for a number of iterations, a second register to hold an initial value of a second index associated with the respective looping instruction, and a third register to hold data indicating non-linear variation pattern associated with the second index. For each iteration, actual increment of the first index and actual increment of the second index are set based on a target increment and the data indicating the non-linear variation pattern associated with the second index.

13 Claims, 5 Drawing Sheets

U.S. PATENT DOCUMENTS 6,598,155 B1     7/2003    Ganapathy et al.
6,665,746 B1*   12/2003   Liong .......................... 710/22

FOREIGN PATENT DOCUMENTS

WO     WO - 95/22101      8/1995

OTHER PUBLICATIONS

Qigang, Zhou et al. Logic Design on FPGA of ATM SAR Function in Broadband Access Network. 2001, IEEE.*

Lee, Yih-Chang et al. Design of ATM AAL1 SAR for Circuit Emulation. 1998, IEEE.*

Baer, Jean-Loup, "Computer Systems Architecture", 1980, Computer Science Press, Inc., Rockville, Maryland, pp. 500-506.

Stallings, William, "Computer Organization and Architecture, Designing for Performance, Fourth Edition", 1996, Prentice-Hall, Inc., Upper Saddle River, New Jersey, pp. 400-412.

Kain, Richard Y., "Advanced Computer Architecture, A Systems Design Approach", 1996, Prentice-Hall, Inc., Englewood Cliffs, New Jersey, pp. 612-614.

* cited by examiner

FIG. 1

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
| Offset 1 ||||||||  Count 1 ||||||||
| 15 | 14 | 13 | 12 | 11 | 10 | 9 | 8 | 7 | 6 | 5 | 4 | 3 | 2 | 1 | 0 |
| Offset 0 ||||||||  Count 0 ||||||||

Y to X mapping for segmentation, Vloop with the -P option

METHOD, APPARATUS, AND SYSTEM FOR VARIABLE INCREMENT MULTI-INDEX LOOPING OPERATIONS

FIELD

An embodiment of the invention relates to the field of processor architecture and implementation, and more specifically, relates to a method, apparatus, and system for improving looping operations.

BACKGROUND

In recent years, computer systems' performance and capabilities have continued to advance rapidly in light of various technological advances and improvements with respect to processor architecture and execution of instructions. In particular, reduced-instruction-set-computers (RISC) have continued to improve significantly and become more popular for various applications. To minimize hardware size and increase clock speed, RISC typically includes a set of simple instructions and control flows. When targeting a specific application, a RISC instruction set can be augmented by instructions that accelerate and/or enhance the functionality needed for the application. These instructions typically improve the overall system performance by reducing the number of cycles needed for operations commonly used in the target application, while attempting to preserve the clock speed.

Packet processing for voice applications typically requires the conversion of packets across different protocol formats. For example, one common application is the conversion and/or transport of payloads from a protocol format that supports variable-size packets (e.g., Internet Protocol (IP) format) to one that supports fixed-size cells (e.g., Asynchronous Transfer Mode (ATM) format). When transmitting IP packets over an ATM network, the IP packets need to be segmented into fixed size blocks that are placed in ATM cells. At the receiving end, the fixed size blocks need to be extracted from the ATM cells and reassembled into the IP packet. Similar segmentation and reassembly (SAR) operations need to be performed when a packet is required to be converted from IP format to ATM format.

One approach in implementing software SARs is to copy data from one memory location to another memory location. The memory copy process is implemented as the body of a loop construct (also called loop or looping instruction herein). When implemented with a traditional RISC instruction set, there are two constraints with respect to a memory copy based SAR:

1. In the memory copy operation, at least one memory address does not change linearly:
   a. In packet reassembly, the source (cell) addresses change non-linearly while the destination (packet) addresses change linearly;
   b. In packet segmentation, the source (packet) addresses change linearly while the destination (cell) addresses change non-linearly.
2. Within the body of the loop construct, on each iteration, the number of data units (bytes) that can be copied varies according to the space left in the fixed cell. For example, assuming that the body of the loop construct is capable of copying up to 32 contiguous bytes from a source to a destination on each iteration. On iteration 1, a total of 32 bytes (starting at the first address of the first cell) can be copied from the first cell to the destination packet. However, on iteration 2, only the 16 bytes remaining (assuming that the cell has 48 bytes total) in the first cell, starting at address 32 in the first cell, can be copied to the destination packet.

Verifying the constraints mentioned above in software requires a large number of arithmetic/logic operations per iteration of the loop construct. Thus, the overhead for performing SAR operations can be substantial.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following detailed description numerous specific details are set forth. However, it is understood that embodiments of the invention may be practiced without these specific details.

As mentioned above, segmentation and reassembly (SAR) operations are performed for data conversion between fixed-sized data formats (e.g., ATM format) and variable-size data formats (IP format). Memory copy is typically used to perform these SAR operations which can be implemented as the body of a conventional loop construct. However, when implemented with a traditional RISC instruction set, memory copy based SAR operations incur substantial processing overhead (e.g., due to the limitations of the conventional loop construct) which results in an increase in execution time.

According to one embodiment of the invention, the limitations and constraints associated with a convention loop construct used for memory copy based SAR operations can be resolved by implementing a new type of loop construct called variable-increment-multi-index loop (VLOOP) construct. In one embodiment of the invention, the VLOOP is a hardware loop designed to accelerate software SAR operations with the following features:

(1) Unlike traditional loop constructs, the VLOOP can have multiple indices (e.g., two indices). One of the indices (also called the Y index herein) can be configured to change linearly from a start value specified by a user. Another index (also called the X index herein) can be configured to change non-linearly from a start value specified by the user. The points at which the index changes non-linearly are specified by the user;

(2) The maximum increment (also called target increment herein) of each index for each iteration of the VLOOP construct is specified by the user. The actual increment of each index for each iteration is computed using hardware logic according to the constraints or criteria imposed by the non-linear variation pattern;

(3) During execution of the VLOOP construct, the values of the X and Y indices are continually updated based on the actual increment computed for each iteration. The values of the indices and the actual increment computed are used to guide the SAR operations.

Figure 1:
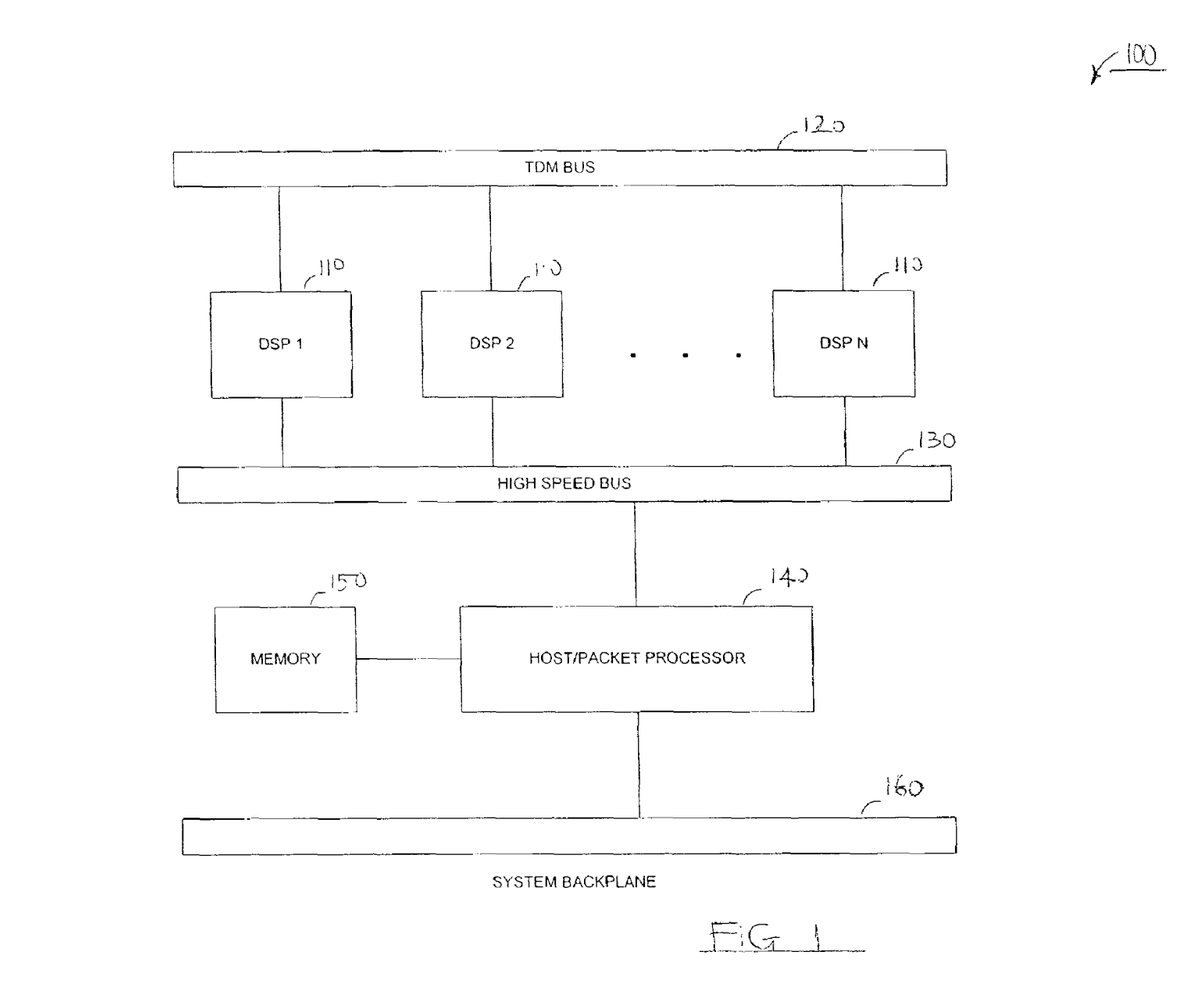
FIG. 1 shows a block diagram of a system according to one embodiment of the invention.

FIG. 1 illustrates a block diagram of one embodiment of an exemplary media processing system 100 in which the teachings of the invention are implemented. In one embodiment, the media processing system 100 includes one or more digital signal processing (DSP) units (also called digital signal processors) 110 that are coupled to a time-division multiplexing (TDM) bus 120 and a high-speed parallel bus 130. The media processing system 100 further includes a host/packet processor 140 that is coupled to a memory 150, the high-speed parallel bus 130, and system backplane 160. In one embodiment, the DSPs 110 are designed to support parallel, multi-channel signal processing tasks and include components to interface with various network devices and buses. In one embodiment, each DSP 110 includes a multi-channel TDM interface (not shown) to facilitate communications of information between the respective DSP and the TDM bus. Each DSP 110 also includes a host/packet interface (not shown) to facilitate the communication between the respective DSP 110 and the host/packet processor 140. In one embodiment, the DSPs 110 perform various signal processing tasks for the corresponding media processing cards which may include voice compression/decompression (encoding/decoding), echo cancellation, dual-tone multi-frequency (DTMF) and tones processing, silence suppression (voice-activity-detection/comfort-noise-generation (VAD/CNG)), packetization and aggregation, jitter buffer management and packet loss recovery, etc.

In one embodiment, each DSP 110 and the host/packet processor 140 include hardware support loop constructs (also called looping instructions or VLOOP herein), which are described in more detail below, for improving the performance of memory copy based SAR operations that are performed in converting data from a fixed size format (e.g., ATM cells) to variable-size format (e.g., IP packets) and vice-versa. As described herein, the hardware support loop construct in accordance with one embodiment of the invention will enable memory copy based SAR operations to be performed efficiently without incurring the substantial processing overhead associated with the traditional loop constructs in conventional RISC environment. In one embodiment of the invention, the hardware support VLOOP construct can have multiple indices including at least one index that can be configured to change non-linearly. In addition, the VLOOP construct provides support for variable increments of the indices during execution of the VLOOP construct. In one embodiment, these various features of the VLOOP construct are supported by a set of registers including a register to store an initial value of the Y index, a register to store an initial value of the X index, and a register to store data indicating the non-linear variation pattern associated with the X index. While the VLOOP uses a large number of registers, many of these registers contain fixed patterns and can be downloaded from memory after being set once. The syntax, structure, and operation of the VLOOP construct are described in greater detail below.

INSTRUCTION DESCRIPTION

Syntax

| VLOOP    | RZ, RX, RY, <ui5:Loop_size>, <ui5:target_increment> |
| VLOOP -D | RZ, RX, RY, <ui5:Loop_size>, <ui5:target_increment> |
| VLOOP -P | RZ, RX, RY, <ui5:Loop_size>, <ui5:target_increment> |
| VLOOP -R | RZ, RX, RY, <ui5:Loop_size> |

In one embodiment, the -R option is orthogonal to the remaining two options (the -D and -P options). When -R option is specified, RZ register contains the target increment. In one embodiment, the -D and -P options cannot be used simultaneously.

In all of the above forms of the VLOOP construct, the loop size can be specified using labels as follows:

VLOOP RZ,RX,RY,Start_Label,End_Label,<ui5:target_increment>

In one embodiment, the following registers are used for the operation of the VLOOP construct:

RZ—This is a specifier for a 32-bit general purpose register (GPR). This register can be used to hold the actual increment for each iteration of the VLOOP construct. This register can also be used as the optional source of the target increment.

RX—This is a specifier for a 32-bit GPR. This register can be used to store the initial value of the X index (also called initial X pointer herein) and the updated X variable for each iteration of the loop.

RY—This is a specifier for a 32-bit GPR. This register can be used to store the initial value of the Y index (also called initial Y pointer herein), and the updated Y variable for each iteration of the loop.

RX+1—This is the first X variation pattern register (implicit). This register is used to store the data indicating the non-linear variation pattern associated with the X index.

RY+1—This is an optional Y count register (implicit) This register is used when the -P (periodic) option is specified.

RX+2—This is an optional second X variation pattern register (implicit). This register is used when the -D (dual) option is specified.

In one embodiment of the invention, the VLOOP construct is designed to enable a 1:1 mapping between a 1-dimensional variable and a 2-dimensional variable. For example, the VLOOP construct enables rapid mapping of the elements of a 1-dimensional array into the elements of a 2-dimensional array and vice versa.

Figure 2:
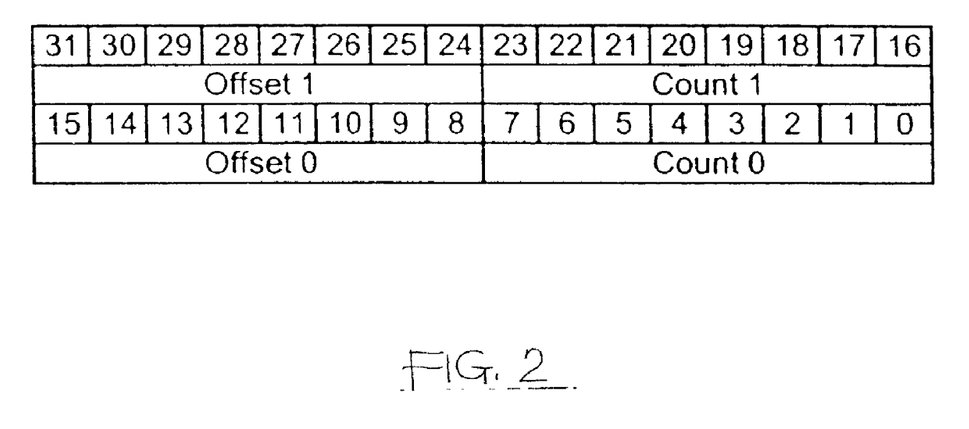
FIG. 2 illustrates an example of a variation pattern register partitioned into two data groups, in accordance with one embodiment of the invention.

In one embodiment, the format of the data in the pattern register RX+1 can be organized as shown in FIG. 2. In this example, the RX+1 is a 32-bit register that is partitioned into two data groups. Each group has two fields as follows:

(1) the first field (e.g., count 0 or count 1) is an integer that identifies the length of the current data block; and (2) the second field (e.g., offset 0 or offset 1) is an integer that identifies the offset from the current block of data to the next block of data.

Continuing with the present discussion, the following description is focused on the operations of the VLOOP construct to enable efficient memory copy based SAR process for data conversion between fixed-size data formats (e.g., ATM format) and variable-sized data formats (e.g., IP format).

OPERATION FOR REASSEMBLY

When the -P option is not set, the VLOOP reads RX,RX+1,RY (and optionally RX+2, RZ) and operates as follows:
1. Each of the variables (indices) X and Y has an initial pointer value that is specified by the user.
2. During execution of the loop, the two variables X and Y are altered together. The user specifies a target increment for the two variables, either as an immediate operand or in the register RZ.
3. The X variable has a variation pattern as illustrated in FIG. 2. The variation pattern for the X variable can be described in one register (e.g., RX+1) or two registers (e.g., RX+1 and RX+2). The user specifies the number of variation pattern registers for the X variable by using the -D option.
4. When the loop is initialized, the first count field (count 0) in the variation pattern register (RX+1 register) is used to set an initial value for a variable (called current_X_count herein). The current_X_count and the target increment are used to determine the value of the actual increment (also called current_increment herein) of each index for each iteration of the loop.
5. The two variables X and Y are altered as follows:
   a. If the current_X_count is greater than or equal to the target increment, then the current_increment is set to the target increment.
   b. If the current_X_count is less than the target increment, then the current_increment is set to the minimum of the current_X_count and the target increment. In this case, the current_increment is set to the current_X_count.
   c. The current_X_count is decremented by the current_increment.
   d. The X and Y variables are incremented by the current_increment. The updated X variable is written into the RX register and the updated Y variable is written into the RY register.
   e. If the current_X_count is zero, the following actions are performed:
      i. The X variable is incremented by the value of the first offset field. The updated X variable is written into the RX register.
      ii. If an unused and non-zero count field remains in the pattern register(s), the current_x_count is set to the value of that count field. Else the loop terminates. It should be noted that four count fields and four offset fields are available with the -D option; otherwise, only two count fields and two offset fields are allowed.

OPERATION FOR SEGMENTATION

When the -P option is set, the VLOOP reads RX,RX+1, RY, RY+1 (and optionally RZ) and operates as follows:
1. Each of the variables (indices) X and Y has an initial pointer value that is specified by the user.
2. During execution of the loop, the two variables X and Y are altered together. The user specifies a target increment for the two variables X and Y, either as an immediate operand, or in the register RZ.
3. The X variable has a variation pattern as illustrated in FIG. 2. For this option, the variation pattern for the X variable can be described in only one register (e.g., RX+1), and only the first count (count 0) and the first offset field (offset 0) of register RX+1 are used in this option. The first count of the RX+1 is also called X_count herein.
4. The Y variable has a count value specified in the register RY+1. This count value for the Y variable is also called Y_count herein.
5. When the loop is initialized, the first count (count 0) in the variation pattern register (RX+1 register) and the count value specified in the RY+1 register are used to set the current_X_count and the current_Y_count, respectively. The current_X_count, the current_Y_count, and the target increment are used to determine the value of the actual increment (also called current_increment herein) of each index for each iteration of the loop.
6. The two variables X and Y are altered as follows:
   a. If both the current_X_count and the current_Y_count are greater than or equal to the target increment, then the current_increment is set to the target increment.
   b. Otherwise the current_increment is set to the minimum of the current_X_count, current_Y_count, and target increment.
   c. The current_X_count and current_Y_count are decremented by the current_increment.
   d. The X and Y variables are incremented by the current_increment. The updated X variable is written into the RX register and the updated Y variable is written into the RY register.
   e. If the current_X_count is zero, the following actions are performed:
      i. The X variable is incremented by the value of the first offset field. The updated X variable is written into the RX register.
      ii. The current_X_count is reset to the value of the first count field in the RX+1 register.
   f. If the current_Y_count is zero, the following actions are performed:
      i. RZ[15:0] is updated with the current_X_count. RZ will be available for inspection once the loop has exited to allow any remaining X data to be moved as needed.
      ii. RZ[31:16] is updated with a count of how many times the X_count (i.e., the first count field of RX+1 register) was reloaded. In one embodiment, this can be considered as (Y_count/X_count)+1.
      It should be noted here that if the -P option is set, an initial X_count of zero will cause an infinite loop because the current_Y_count will never be decremented.
      iii. The loop terminates.

Figure 3:
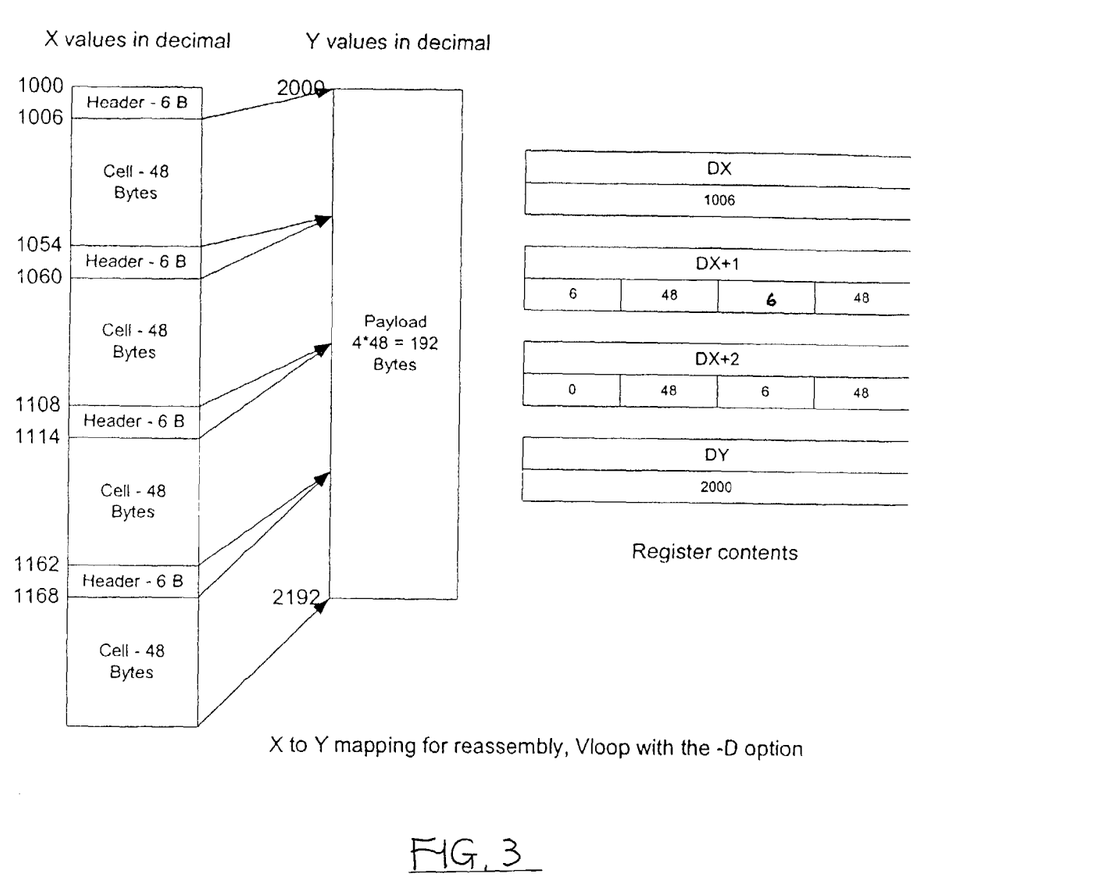
FIG. 3 illustrates an example of X to Y mapping for reassembly operation, using the VLOOP construct, in accordance with one embodiment of the invention.

FIG. 3 illustrates an example of X to Y mapping for reassembly operation, using the VLOOP construct with the -D option. In this example, as shown in FIG. 3, the VLOOP construct is used to copy data from the various cells stored in memory starting at memory address 1006 (decimal) to another memory location starting at memory address 2000 (decimal). As described above, the VLOOP construct operates to allow the X index to change non-linearly according to the variation pattern stored in register RX+1 and RX+2. As shown in FIG. 3, the initial value of the X index (1006) is stored in the X register and the initial value of the Y index (2000) is stored in the Y register. In this example, data indicating variation patterns for the X index are stored in register RX+1 and register RX+2. According to the operations of the VLOOP construct as described above, the X index and the Y index will be set accordingly so that the data blocks stored in memory locations 1006–1053, 1060–1107, 1114–1161, and 1168–1215 will be copied to memory locations 2000–2192, skipping over the header sections.

Figure 4:
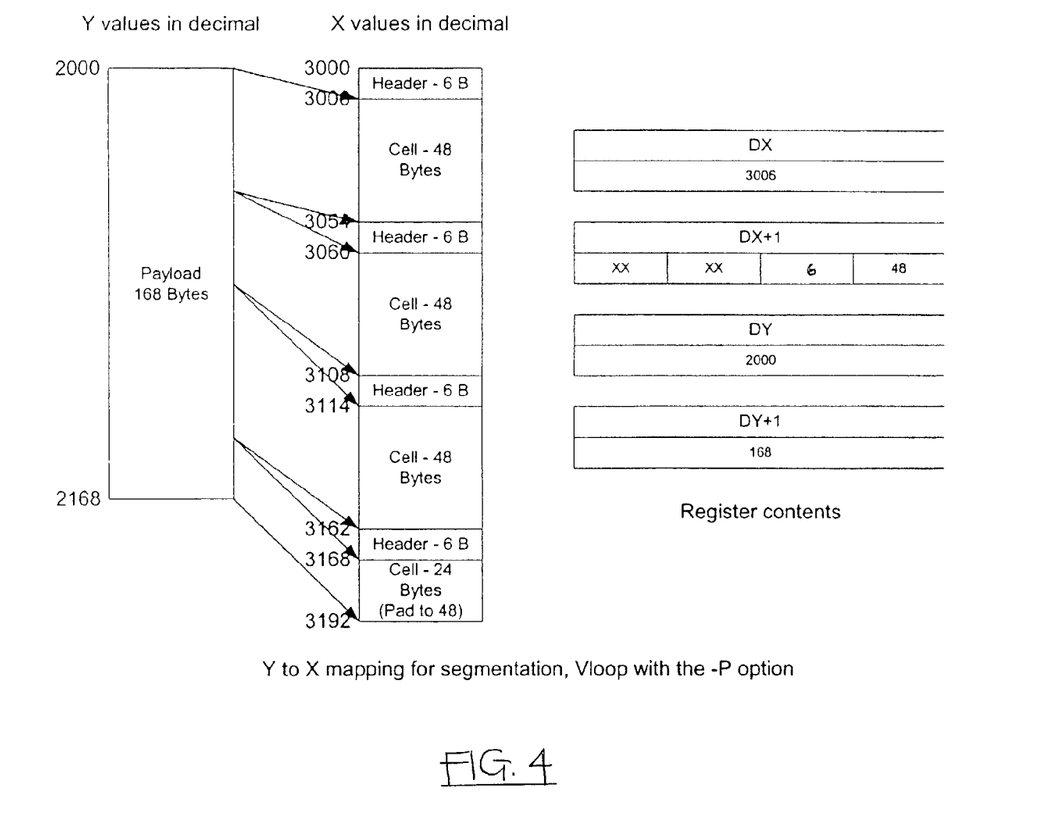
FIG. 4 illustrates an example of Y to X mapping for segmentation operation, using the VLOOP construct, in accordance with one embodiment of the invention.

FIG. 4 illustrates an example of Y to X mapping for segmentation operation, using the VLOOP construct with the -P option. In this example, as shown in FIG. 4, the VLOOP construct is used to copy data from the memory locations 2000–2168 to various cells stored in memory starting at memory address 3006. As described above, the VLOOP construct operates to allow the X index to change non-linearly according to the variation pattern stored in register RX+1. As shown in FIG. 4, the initial value of the X index (3006) is stored in the X register and the initial value of the Y index (2000) is stored in the Y register. In this example, data indicating variation patterns for the X index are stored in register RX+1. Note that for this option, only the first count field and the first offset field in register RX+1 are used. The count value for the Y index is specified in register RY+1. In this example, the count value for the Y index is 168. According to the operations of the VLOOP construct as described above, the X index and the Y index will be set accordingly so that the data blocks stored in memory locations 2000–2168 will be copied to various cells in memory locations 3006–3053, 3060–3107, 3114–3161, and 3168-3192, skipping over the header sections. Note that in this example, only 24 bytes are copied into the last cell starting at memory address 3168, which is padded to 48 bytes long.

Figure 5:
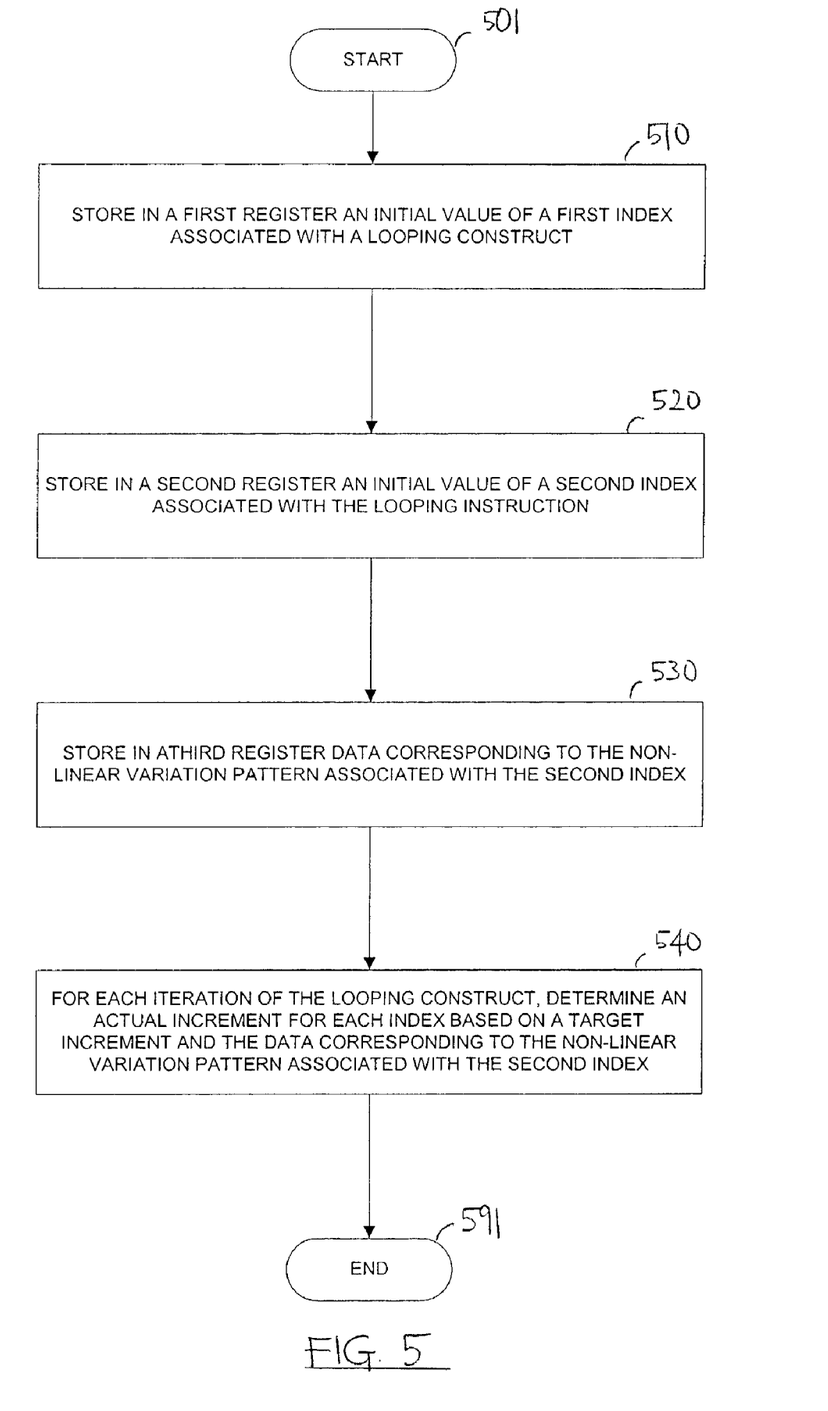
FIG. 5 shows a flow diagram of a method according to one embodiment of the invention.

FIG. 5 shows a flow diagram of a method according to one embodiment of the invention. At block 510, store in a first register (e.g., RY register) an initial value of a first index (e.g., Y index) associated with a VLOOP construct. The first index is configured to change linearly from the initial value of the first index during execution of the VLOOP construct. At block 520, store in a second register (e.g., RX register) an initial value of a second index (e.g., X index) of the VLOOP construct. The second index is configured to change non-linearly from the initial value of the second index during execution of the VLOOP construct. At block 530, store in a third register (e.g., RX+1 register) data corresponding to the non-linear variation pattern associated with the second index. At block 540, determine an actual increment for each index for each iteration of the VLOOP construct based on a target increment specified by a user and the data corresponding to the non-linear variation pattern associated with the second index.

While the invention has been described in terms of several embodiments, those of ordinary skill in the art will recognize that the invention is not limited to the embodiments described herein. It is evident that numerous alternatives, modifications, variations and uses will be apparent to those of ordinary skill in the art in light of the foregoing description.

What is claimed is:

1. An apparatus comprising:
   a first register to hold an initial value of a first index associated with a looping instruction to be executed for a number of iterations;
   a second register to hold an initial value of a second index associated with the respective looping instruction; and
   a third register to hold data indicating non-linear variation pattern associated with the second index,
   wherein, for each iteration, a current increment of the first index and a current increment of the second index are dynamically determined based on a target increment and the data indicating the non-linear variation pattern associated with the second index,
   wherein the respective looping instruction is executed to copy data from one memory location to another memory location as part of segmentation and reassembly (SAR) operations performed for data conversion between fixed-sized and variable-sized data formats,
   wherein the third register is a multi-bit register partitioned into a first group of data and a second group of data, each group of data including a first count field corresponding to a first number which identifies the length of a current block of data and a first offset field corresponding to a second number which identifies the offset from the current block of data to the next block of data,
   wherein, for reassembly operations, the first index and the second index are altered during execution of the looping instruction based on the target increment and a current increment which is dynamically determined based on the target increment and the data indicating the non-linear pattern associated with the second index,
   wherein, when the loop is initialized, the first count field in the third register is used to set a current count associated with the second index, and wherein, for each iteration of the looping instruction, the current increment is set based on the current count associated with the second index and the target increment,
   wherein the current increment is set to the target increment if the current count associated with the second index is greater than or equal to the target increment and set to the current count if the current count is less than the target increment.

2. The apparatus of claim 1 wherein the current count is decremented by the current increment and the first and second indices are incremented by the current increment.

3. The apparatus of claim 2 wherein, when the current count is equal to a predetermined number, the second index is altered according to the value of the first offset field in the third register.

4. The apparatus of claim 1 wherein, for segmentation operations, the first index and the second index are altered during execution of the looping instruction based on the target increment and a current increment which is dynamically determined based on the target increment, a current count associated with the first index, and a current count associated with the second index.

5. The apparatus of claim 4 wherein, when the loop is initialized, the current count associated with the second index is set to the first count field in the third register and the current count associated with the first index is set to a value stored in a fourth register associated with the first index.

6. An apparatus comprising:
   a first register to hold an initial value of a first index associated with a looping instruction to be executed for a number of iterations;
   a second register to hold an initial value of a second index associated with the respective looping instruction; and
   a third register to hold data indicating non-linear variation pattern associated with the second index,
   wherein, for each iteration, a current increment of the first index and a current increment of the second index are dynamically determined based on a target increment and the data indicating the non-linear variation pattern associated with the second index,
   wherein the respective looping instruction is executed to copy data from one memory location to another memory location as part of segmentation and reassembly (SAR) operations performed for data conversion between fixed-sized and variable-sized data formats,
   wherein the third register is a multi-bit register partitioned into a first group of data and a second group of data, each group of data including a first count field corresponding to a first number which identifies the length of a current block of data and a first offset field corresponding to a second number which identifies the offset from the current block of data to the next block of data, wherein, for segmentation operations, the first index and the second index are altered during execution of the looping instruction based on the target increment and a current increment which is dynamically determined based on the target increment, a current count associated with the first index, and a current count associated with the second index, wherein, when the loop is initialized, the current count associated with the second index is set to the first count field in the third register and the current count associated with the first index is set to a value stored in a fourth register associated with the first index, wherein the current increment is set to the target increment if both the current count associated with the first index and the current count associated with the second index are greater than or equal to the target increment, and otherwise set to the minimum of current count associated with the first index, the current count associated with the second index, and the target increment.

7. The apparatus of claim 6 wherein the current counts associated with the first and second indices are decremented by the current increment and the first and second indices are incremented by the current increment.

8. The apparatus of claim 7 wherein, when the current count associated with the second index is equal to a predetermined number, the second index is altered according to the value of the first offset field in the third register and the first count field in the third register is reloaded.

9. A method comprising:
storing in a first register an initial value of a first index associated with a loop construct to be executed for a number of iterations;
storing in a second register an initial value of a second index associated with the respective loop construct;
storing in a third register data corresponding to non-linear variation pattern associated with the second index; and
determining dynamically, for each iteration, a current increment for each index of the loop construct based on a target increment specified by a user and the data corresponding to the non-linear variation pattern associated with the second index, wherein the current increment is used to continually update the first index and the second index,
wherein the respective loop construct is executed to copy data from one memory location to another memory location as part of segmentation and reassembly (SAR) operations performed for data conversion between fixed-sized and variable-sized data formats,
wherein the third register is a multi-bit register partitioned into a first group of data and a second group of data, each group of data including a first count field corresponding to a first number which identifies the length of a current block of data and a first offset field corresponding to a second number which identifies the offset from the current block of data to the next block of data,
altering the first index and the second index during execution of the loop construct based on the target increment and a current increment which is dynamically determined based on the target increment and the data corresponding to the non-linear variation pattern associated with the second index, wherein, for reassembly operations, altering the first index and the second index includes:
setting a current count associated with the second index using the first count field in the variation pattern register when the loop is initialized; and
for each iteration of the loop construct:
setting the current increment based on the current count associated with the second index and the target increment,
wherein setting the current increment includes:
setting the current increment to the target increment if the current count associated with the second index is greater than or equal to the target increment; and
setting the current increment to the current count associated with the second index if the current count is less than the target increment.

10. The method of claim 9 further including:
decrementing the current count by the current increment;
incrementing the first and second indices by the current increment; and
when the current count is equal to a predetermined number, altering the second index according to the value of the first offset field in the third register.

11. The method of claim 9 wherein, for segmentation operations, altering the first index and the second index includes:
setting a current count associated with the second index to the first count field in the third register and a current count associated with the first index to a value stored in a fourth register, when the loop is initialized; and
for each iteration of the loop construct:
setting the current increment based on the current counts associated with the first and second indices and the target increment.

12. The method of claim 11 wherein setting the current increment includes:
setting the current increment to the target increment if both the current count of the first index and the current count of second index are greater than or equal to the target increment; and
setting the current increment to the minimum of current count of the first index, the current count of the second index, and the target increment if the current count of either the first index or second index is less than the target increment.

13. The method of claim 12 wherein the two current counts associated with the first and second indices are decremented by the current increment and the first and second indices are incremented by the current increment, and wherein, when the current count is equal to a predetermined number, the second index is altered according to the value of the first offset field in the third register and the first count field in the third register is reloaded.

* * * * *